Jan. 25, 1927.

J. S. BROWN 1,615,613

POWER TRANSMITTING DEVICE FOR MOTOR VEHICLES

Filed July 15, 1922      3 Sheets-Sheet 2

INVENTOR
J. S. Brown
BY
Howard P. Denison
ATTORNEY.

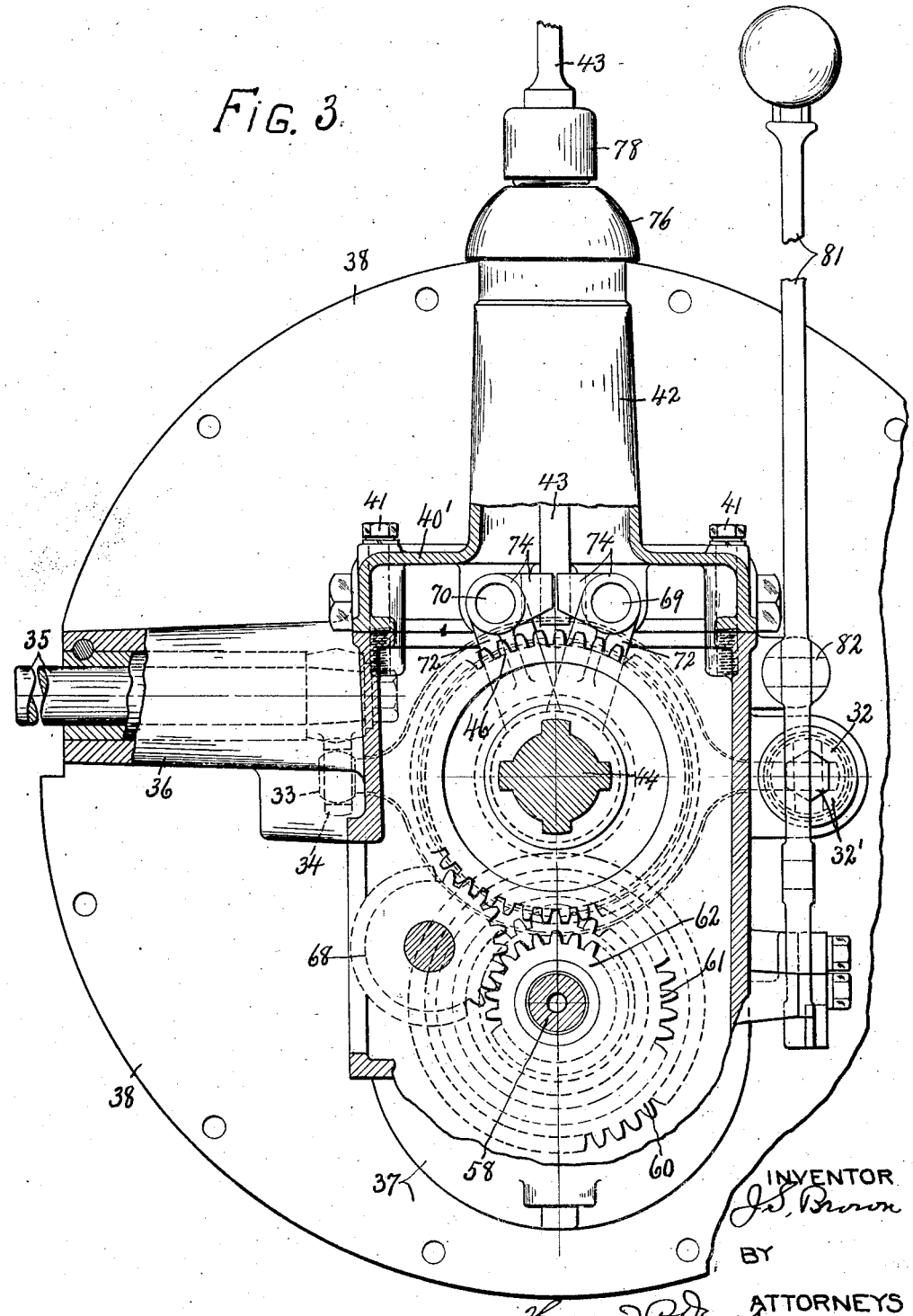

Patented Jan. 25, 1927.

1,615,613

UNITED STATES PATENT OFFICE.

JULIAN S. BROWN, OF SYRACUSE, NEW YORK.

POWER-TRANSMITTING DEVICE FOR MOTOR VEHICLES.

Application filed July 15, 1922. Serial No. 575,283.

This invention relates to a variable speed power transmission gearing for motor vehicles and analogous uses by which rotary motion is transmitted from the crank shaft of the engine to a coaxial driven shaft through the medium of a friction clutch and gearing of the sliding selective type and refers more particularly to the manner of supporting and operating the clutch shifting means.

The main object is to secure greater efficiency, durability, ease of operation and economy in the manufacture of devices of this character by constructing the various parts in more compact relation so that the entire unit may be installed in the machine in relatively smaller space than has heretofore been practiced.

In other words, I have sought to bring the clutch mechanism and gear transmission into closer axial relation and thereby to shorten their respective shaft sections for the purpose of reducing torsional strains and vibrations under heavy loads and high speeds and otherwise increasing the general sturdiness and efficiency of operation of the entire unit.

One of the specific objects is to balance the clutch mechanism in such manner as to reduce the vibration to a minimum, particularly under high speeds, and at the same time to obtain a more uniform frictional contact between the clutch faces of the several disks throughout their areas and also to reduce the weight of the clutch as a whole to enable it to be shifted with less power than has heretofore been required.

A further object is to operate the clutch against the action of its engaging springs through the medium of a lever having center-point contacts with diametrically opposite sides of the clutch shifting sleeve to prevent binding of said sleeve upon its ways or bearings particularly in releasing the clutch.

Other objects and uses relating to specific parts of the device will be brought out in the following description:

In the drawings:

Figure 3 is a transverse vertical sectional view through the gear case just at the rear of the standard for the gear shifting lever looking forwardly.

Figure 1:
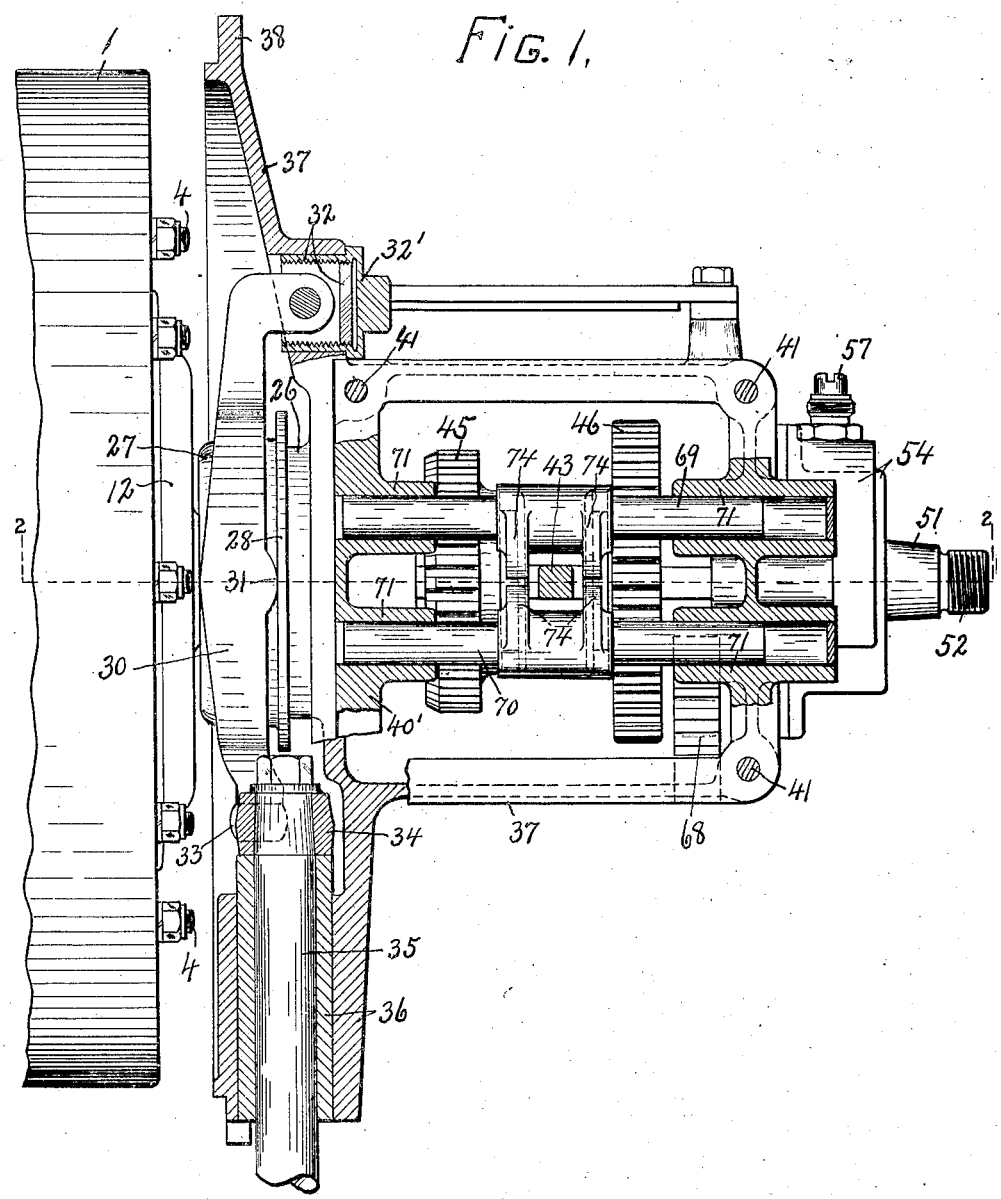
Figure 1 is a top plan partly in section of the power transmitting mechanism embodying the various features of my invention, the parts being shown in their neutral positions.

As illustrated, this device comprises a clutch mechanism, a variable speed transmission gearing and a speedometer drive mechanism, all assembled end to end in sequence from front to rear as a unitary article of manufacture ready for installation in the machine by simply bolting the gear case to the rear end of the frame and connecting the rear end of the spline shaft of the transmission gearing to the shaft section, which leads to the differential gearing.

Clutch mechanism.

The clutch mechanism comprises a flywheel —1— adapted to be secured by bolts —2— to the rear end of the crank-shaft of the engine (not shown) coaxial therewith and provided with an internal spline-ring —3— detachably secured thereto by bolts —4—, said spline-ring being provided with a circumferential series of internal ribs or splines —5— arranged in uniformly spaced relation circumferentially about the axis of the wheel —1— for interlocking engagement with the notched peripheries of a series of metal friction disks —6—.

A spline wheel —7— is secured to the front tapered end of a shaft section —8— coaxial with the fly-wheel —1— and within the spline-ring —3— for rotation relatively thereto and is provided with peripheral splines —9— also arranged in uniformly spaced relation circumferentially for interlocking engagement with a series of internally notched fiber disks —10— alternating with the metal disks —6— for frictional engagement therewith.

The rear end of the fly-wheel —1— is chambered to receive spline-ring —3— and spline-wheel —7— and also the several disks —6— and —10—, which are concentric with the axis of the shaft —8— between the parts —3— and —7— and are normally pressed together in frictional contact by means of an annular flange —11— on the spline-wheel —7— and an axially movable pressure plate —12— coaxial with the wheel —7— at the rear end thereof.

This pressure plate is provided with a series of studs or pins —13— rigidly secured thereto in uniformly spaced relation circumferentially around the axis of the wheel —7— and shaft —8— and extended forwardly through guide openings in the rear end wall of the wheel —7—, which is cup-shaped and arranged with its open end facing forwardly so that the front ends of the studs or pins —13— may project into the intervening space.

Each stud is surrounded by a conical spiral spring —14— having its larger end seated against the rear end wall of the wheel —7— and its smaller end projecting forwardly to bear against a suitable stop pin or shoulder —15— on the corresponding end of the stud or pin so that the wheel —7— contains a plurality of these coil springs —14— (one for each stud —13—) arranged in uniformly spaced relation circumferentially around the axis of the shaft —8— and wholly within the periphery of the wheel —7— and mainly in transverse alinement with the friction disks —6— and —10—, thereby evenly distributing weight about the axis of revolution of the wheel —7— and greatly assisting in maintaining a balanced condition of the entire clutch mechanism to reduce vibration and also to enable the friction disks to be pressed one against the other with uniform pressure at all points in their circumferences.

The front end of the shaft —8— is reduced in diameter and is journaled in a central opening —16— in the fly-wheel —1— through the medium of anti-friction ball-bearings —17—, the portion of the shaft between the bearings —17— and front end of the hub of the wheel —7— being threaded for receiving a lock nut —18— by which the wheel —7— is held against forward displacement from the tapered portion of the shaft —8—.

This shaft —8— extends rearwardly some distance beyond the wheel —7— and has its rear end enlarged and provided with a spur wheel —19— and a central socket —20— opening from its rear end face for a purpose hereinafter described.

The pressure plate —12— is provided with a central rearwardly projecting hub —21— threaded internally and engaged by an externally threaded sleeve —22— loosely mounted upon the shaft section —8— and having its rear end provided with an annular shoulder —23— normally spaced apart from the front face of the gear —19— so as to leave ample clearance for axial movement of the pressure plate —12— along the shaft section —8— for releasing the friction between said plate and the several disks —6— and —10—.

The sleeve —22— constitutes a removable part of the hub —21— of the pressure plate —12— and is journaled in a coaxial bearing collar —24— through the medium of anti-friction ball-bearings —25—, the latter being interposed between inner and outer bearing rings mounted respectively, on the sleeves —22— —24— between the annular flange —23— and rear end of the hub —21— and within the rear end of the collar —24—.

The collar —24— is provided with an inwardly projecting transverse web some distance from the ends thereof and adapted to abut against the front face of the outer bearing ring for the balls —25—, the inner face of said web being loosely mounted upon the periphery of the hub —21— of the pressure plate —12— to turn freely thereon and also to permit relative rotation of said pressure plate therein.

Figure 2:
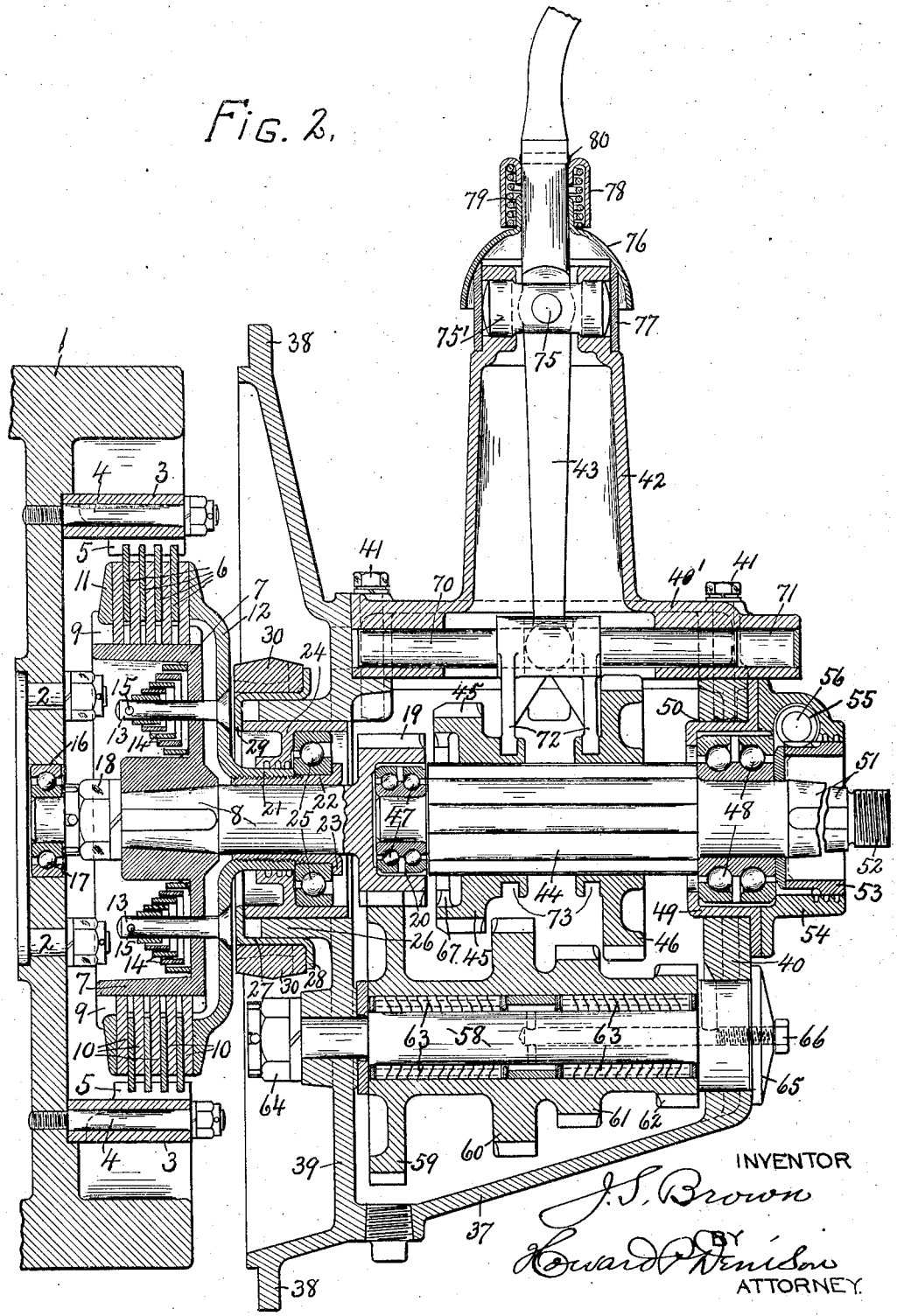
Figure 2 is an enlarged longitudinal vertical sectional view taken on line 2—2, Figure 1.

The collar —24— is movable axially in a suitable guide opening in the front wall of the gear case in axially spaced relation to the front face of the gear —19— and together with the pressure plate —12— is normally spring pressed forwardly by the springs —14— through the medium of the flange —23— and ball-rings between the sleeve —22— and collar —24— as shown in Figure 2.

*Clutch releasing means.*

The collar —24— is slidable axially of and within a hub —26— on the front end of a gear case hereinafter described and upon the periphery of this hub is mounted for axially sliding movement a cylindrical shifting ring —27— having its rear end provided with an out-turned flange —28— and its forward end provided with an in-turned flange —29—, the latter being extended across the front end face of the collar —24— for engagement therewith to shift the collar —24— and pressure plate —12— rearwardly against the action of the springs —14— for releasing the friction grip between the friction disks —6— and —10—.

A shifting lever —30— having a central opening is mounted upon the periphery of the shifting ring —27— and extends laterally or radially in opposite directions therefrom, the rear edge of the central portion of said lever at diametrically opposite sides of the shifting ring being provided with forwardly projecting rounded bosses —31— for direct contact with diametrically opposite sides of the flange —28— whereby the points of engagement of the lever with the shifting ring will always be in diametrical alignment to assure direct axial movement of the shifting ring and various parts operated thereby without liability of binding, all of which contributes to free and noiseless operation of the clutch mechanism and also assists in maintaining the proper balance of those parts to avoid vibration when in operation.

The lever —30— extends some distance beyond opposite sides of the main body of the gear case and is fulcrumed at one end, preferably the right-hand end, looking forwardly to a diametrically slotted screw plug —32— which is engaged in an internally threaded bushing —32'— in the corresponding side of said gear case to provide adjustment for the lever —30—, the other end of said lever being provided with a ball —33— which is engaged in an apertured crank-arm —34— on the inner end of a laterally extending shaft —35— to which may be attached a suitable clutch operating pedal not necessary to herein illustrate or describe except that the shaft —35— is journaled in a laterally extending bearing —36— on the gear case.

*Transmission gearing.*

The gear case as —37— has flange —38— secured to the engine frame in close proximity to the fly-wheel —1—, said gear case being provided with front and rear end walls —39— and —40— and is also provided with an opening in its top of sufficient size to permit the several gears to be inserted and removed therethrough.

The open top is, however, normally closed by a cover plate —40'— secured in place by bolts —41— and provided with a central upwardly projecting hollow pedestal —42— for receiving a shifting lever —43—.

A spline-shaft —44— is revolubly mounted within the gear case —37— coaxial with the driving shaft section —8— for receiving and supporting a pair of gears —45— and —46—, which are slidable axially thereon, the forward end of said shaft —44— being journaled in bearings —47—, while the rear end is journaled in bearings —48— in a bushing —49— which is secured in an opening —50— of sufficient size to permit the shaft section —44— with the bearings thereon to be readily inserted and withdrawn axially therethrough.

The rear end of the shaft —44— is provided with a tapered portion —51— and a threaded end portion —52—, adapted to be attached to an extension shaft not shown, leading to the usual differential gearing for transmitting motion thereto.

A gear ring —53— is secured to the tapered portion —51— of the shaft —44— within a cap plate —54— to mesh with a relatively smaller gear —55— on a shaft —56— which is provided with a coupling member —57— for connection to a speedometer not shown.

A jack shaft —58— is mounted within the gear case —37— for receiving and supporting a series of coaxial gears —59—, —60—, —61— and —62—, which are journaled upon the jack shaft through the medium of anti-friction roller bearings —63—, the front end of the jack shaft being secured in place by a lock nut —64—.

A cap —65— is secured by a bolt —66— to the adjacent enlarged end of the jack shaft —58— to engage the rear end face of the wall —40— and together with the nut —64— serve to hold the jack shaft against endwise movement within the gear case.

The gear —45— is provided with an internal gear —67— movable endwise therewith into and out of engagement with the adjacent end of the gear —19— for transmitting direct high speed rotary motion from the shaft section —8— to the spline shaft —44—.

A supplemental gear —68— is journaled within the gear case —37— to mesh with the gear —62— and also in position to be engaged by the gear —46— when the latter is shifted from its neutral position rearwardly for reversing the direction of rotation of the spline shaft —44—, thus completing the ability to drive the machine three speeds forward and one speed reverse.

*Gear shifting means.*

A pair of shifting rods —69— and —70— are slidably mounted in suitable ways —71— in the cap plate —40'— parallel with and directly above the spline shaft —44— and in spaced relation at opposite sides of the axis of the pedestal —42— for receiving and supporting a pair of gear shifting arms —72— which enter annular grooves —73— in the hubs of the gears —45— and —46—, respectively, whereby the shifting of either rod endwise will effect a similar movement of the corresponding gear.

These rods —69— and —70— are also provided with lugs —74— projecting radially toward each other into close proximity but having their adjacent ends slightly separated to allow movement of either independently of the other.

These lugs are preferably furcated to receive the lower end of the lever —43— which is fulcrumed at —75— to a rock-shaft —75'— to swing forwardly and rearwardly, said rock-shaft being journaled in suitable bearings in the upper end of the pedestal —42— to permit the lever to swing laterally.

A semi-spherical cap —76— is loosely mounted upon the intermediate portion of the lever —43— and bears upon a sleeve —77— on the upper end of the pedestal to move about the axes of the fulcrum —74— and —75— and is yieldingly held in place by a ferrule —78— and spring —79— enclosed within said ferrule, which latter is held against upward displacement by a pin —80—.

It will be observed that the distance between the fulcra —75— and —75'— and point of engagement of the lower end of the lever with the lugs —74— is relatively long, in this instance, twice the distance between said points of engagement with said lugs and the axis of the spline-shaft —44—, the object of which is to permit shifting of the gears —45— and —46— by a relatively slight movement of the upper end of the lever —43—.

The use of a plurality of relatively small spiral springs as —14— uniformly distributed about the axis of the shaft —8— for exerting pressure upon the plate —12— and friction disks of the clutch mechanism not only enables the various parts of the clutch to be brought into compact relation axially and permits the gear-case to be brought closer to the clutch mechanism but also establishes a balanced condition of said mechanism and to that extent reduces the liability of vibration particularly under high speeds and also assures a more uniform contact of the friction disks one with the other throughout their circumferences, whereby a less number of the disks may be employed with increased efficiency of operation.

Furthermore, by mounting the shifting sleeves —24— and —27—, respectively, within and upon the hub —26— of the gear case permits further shortening of the entire unit including the shaft section —8—, all of which contribute to the sturdiness and freedom of vibration of those parts resulting in increased efficiency, durability, likeness and economy of manufacture and enables the entire transmission gearing and clutch mechanism to be easily withdrawn rearwardly by simply removing the bolts connecting the gear case to the engine frame.

Integrally uniting the gears —59—, —60—, —61— and —62— permits those parts to be journaled upon the jack-shaft —58— through the medium of roller bearings wholly within the ends of the combined gears, thereby assuring anti-friction support throughout the major portion of the length thereof in addition to the reduction of the length of the gear case and liability of vibration of the operating parts under all speeds and also reducing the length of the spline shaft —44—, all of which further contributes to the sturdiness and efficiency of the unit as a whole and permits it to be installed in relatively smaller space than has heretofore been practicable.

A brake-lever —81— is fulcrumed at —82— to one side of the gear case —37— and is adapted to be connected by any suitable means to a brake-band or shoe, not shown.

*Operation.*

Assuming that the lever —43— is in its neutral position and that the clutch is released under which conditions, the springs —14— will force the plate —12— forwardly to compress the disks —6— and —10— one against the other and against the annular flange —11—, thereby transmitting rotary motion to the shaft section —8— through the medium of the clutch wheel —7— during which time, the spline shaft —44—will be at rest and the gears —59—, —60—, —61— and —62— will be rotated by the gear —19— while the shaft —8— will be free to rotate on the anti-friction bearings —25— and —47—.

Turning the shaft —35— through the medium of the usual clutch pedal, not shown, will cause its crank arm —34— to operate the clutch shifting lever —30— about its fulcrum, thereby forcing the clutch plate —12— rearwardly along the shaft section —8— through the medium of the sleeves —24— and —27— against the action of the springs —14— for releasing the pressure of the friction disks one upon the other and permitting the fly-wheel —1— to be rotated by the engine independently of the shaft —8— which then may be at rest.

While the clutch disks are thus released, the shifting lever —43— may be operated to selectively shift the gears —46—, —45— and —67— into mesh with their companion gears —61—, —60— or —19— according to the speed required or by another movement of the lever, the gear —46— may be shifted into engagement with the gear —68— for reversing the direction of motion of the spline shaft —44— and traction wheels driven thereby, it being understood that after each selective speed changing shift is made, the clutch is released to allow motion to be transmitted to the spline shaft.

What I claim is:

1. A power transmitting mechanism including a gear case having a hollow hub, relatively rotatable driving and driven elements co-axial with the hub, a clutch wheel secured to the driven element, clutch connections between the driving element and clutch wheel, a collar slidable axially of and within the hub, a pressure plate journaled within the collar to move axially therewith and spring-pressed axially in one direction to frictionally engage the clutch connections between the driving element and clutch wheel, a ring slidable axially of and upon the periphery of the hub for engaging the collar and moving said collar and pressure plate axially to release the clutch connections, and means operable at will for moving the ring axially on the hub.

2. A power transmitting mechanism of the selective sliding gear type including a gear case having a guide opening in one end, an axially movable collar guided in said opening, a clutch section journaled in the collar for relative rotary movement, and a shaft extending axially through and supported by said clutch section, and means for shifting said collar and clutch section axially relatively to the shaft, said means including a sleeve slidable axially of and upon the gear case and engaged with said collar.

3. A power transmitting mechanism of the selective sliding gear type including a gear case having a guide opening in one end, an axially movable collar guided in said opening, a clutch section journaled in the collar for relative rotary movement, and a shaft extending axially through and supported by said clutch section, and means for shifting said collar and clutch section axially relatively to the shaft, said means including an internally threaded bushing rotatably mounted on the gear case, a threaded plug engaged by said bushing for axial movement as the bushing is turned, and a shifting lever fulcrumed on said plug.

4. A power transmitting mechanism of the selective sliding gear type, including a gear-case, a collar slidable axially in the gear-case, a clutch having one of its members journaled in the collar and movable axially therewith, a ring slidable on the gear case and engaging the collar for moving the same axially in one direction and a lever encircling the ring and extending radially in opposite directions therefrom, an adjustable fulcrum for one end of the lever means including a bushing rotatably mounted on the gear-case for adjusting said fulcrum and means at the opposite end of the lever for rocking the same upon its fulcrum.

In witness whereof I have hereunto set my hand this 13th day of July, 1922.

JULIAN S. BROWN.